US009003477B2

(12) United States Patent
Gillum et al.

(10) Patent No.: US 9,003,477 B2
(45) Date of Patent: Apr. 7, 2015

(54) MODEL FOR MANAGING HOSTED RESOURCES USING LOGICAL SCOPES

(75) Inventors: Christopher Gillum, Kirkland, WA (US); Grzegorz Gogolowicz, Redmond, WA (US); Nathan Talbert, Seattle, WA (US); Kenneth Wolf, Seattle, WA (US); Kevin Lam, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 13/535,345

(22) Filed: Jun. 27, 2012

(65) Prior Publication Data

US 2014/0007178 A1 Jan. 2, 2014

(51) Int. Cl.
| | |
|---|---|
| *H04L 29/00* | (2006.01) |
| *G06F 9/50* | (2006.01) |
| *G06F 21/00* | (2013.01) |
| *G06Q 10/06* | (2012.01) |
| *G06F 21/60* | (2013.01) |

(52) U.S. Cl.
CPC .............. *G06F 21/00* (2013.01); *G06F 9/5061* (2013.01); *G06F 21/604* (2013.01); *G06F 2221/2145* (2013.01); *G06Q 10/06313* (2013.01)

(58) Field of Classification Search
None
See application file for complete search history.

(56) References Cited

U.S. PATENT DOCUMENTS

2010/0138830 A1* 6/2010 Astete et al. ............... 718/1

| | | | |
|---|---|---|---|
| 2011/0126168 A1 | 5/2011 | Ilyayev | |
| 2011/0167469 A1* | 7/2011 | Letca et al. ............... | 726/1 |
| 2011/0258612 A1 | 10/2011 | Matthiesen et al. | |

OTHER PUBLICATIONS

Cheng, et al., "A Multi-Tenant Oriented Performance Monitoring, Detecting and Scheduling Architecture Based on SLA", Retrieved at <<http://ieeexplore.ieee.org/stamp/stamp.jsp?tp=&arnumber=5420114>>, Joint Conferences on Pervasive Computing (JCPC), Dec. 3-5, 2009, pp. 599-604.

Guo, et al., "A Framework for Native Multi-Tenancy Application Development and Management", Retrieved at <<http://ieeexplore.ieee.org/stamp/stamp.jsp?tp=&arnumber=4285271&userType=inst>>, 9th IEEE International Conference on E-Commerce Technology and 4th IEEE International Conference on Enterprise Computing, E-Commerce and E-Services (CEC-EEE), Jul. 23-26, 2007, pp. 551-558.

(Continued)

*Primary Examiner* — Brandon Hoffman
*Assistant Examiner* — Helai Salehi
(74) *Attorney, Agent, or Firm* — Ben Tabor; Kate Drakos; Micky Minhas

(57) ABSTRACT

A hosted resource management system is described herein that provides systems and methods whereby a cloud-based tenant can define a logical model that allows the tenant to work with cloud-based entities in a manner that aligns with the tenant's own purpose and thinking. The system then reflects this model in a set of management tools and access paradigms that are provided to the cloud-based tenant. Each division in the logical model is termed a scope, and can include various types of cloud-based entities. Each of these scopes may contain similar cloud-based entity types, but because of the organization provided by scopes the tenant can manage these cloud-based entities according to the view and model that the tenant defines. Thus, the hosted resource management system provides a way of managing cloud-based entities that is intuitive for cloud-based tenants and facilities easier management of large-scale applications with many cloud-based entities.

20 Claims, 5 Drawing Sheets

(56) References Cited

OTHER PUBLICATIONS

Tsai, et al., "Service-Oriented Cloud Computing Architecture", Retrieved at <<http://ieeexplore.ieee.org/stamp/stamp.jsp?tp=&arnumber=5501650>>, 7th International Conference on Information Technology, (ITNG), Apr. 12-14, 2010, pp. 684-689.

Fehling, et al., "A Framework for Optimized Distribution of Tenants in Cloud Applications", Retrieved at <<http://ieeexplore.ieee.org/stamp/stamp.jsp?tp=&arnumber=5557985, Cloud Computing (CLOUD), 2010, IEEE 3rd International Conference on Cloud Computing, Retrieved Date: Dec. 26, 2011, pp. 252-259.

* cited by examiner

MODEL FOR MANAGING HOSTED RESOURCES USING LOGICAL SCOPES

BACKGROUND

Cloud computing may refer to any type of datacenter in which some level of resources or management are provided off-site by a third party. A tenant is an individual user or organization of cloud computing resources and may include particular applications that run on cloud-based servers. Cloud computing may include data centers in which multiple tenants share a set of physical hardware resources, either by partitioning that divides the tenants up onto individual servers, or virtualization that allows multiple tenants to share the same physical server by giving each tenant its own virtual machine (or even a portion of virtual machine), or some combination of these two. In many cases, it is desirable for the cloud host to not expose to tenants the topography of the network or resources on which their applications are running, so that the host can make changes to the infrastructure, move tenants around, and upgrade resources over time in the interest of efficient management of the cloud-based service.

Cloud-based environments typically provide a level of management tools and infrastructure through which tenants can manage the resources assigned to their applications, and can sub-allocate particular resources assigned to them to particular activities. Management may also include the process of uploading new applications and data to be hosted by the cloud-based environment. The process of preparing a cloud-based environment for hosting a particular application or service may involve providing particular software workflows, databases, assemblies, and configuration files. Each of these may include numerous sub-items, such as software workflows, which comprise activities and sequencing information about activities within the workflow. In addition, items may include security information and other characteristics that define who can access and manage particular parts of a hierarchy or other set of items.

Unfortunately, physical divisions of the cloud-based platform often do not line up will with logical divisions of applications. It is non-trivial to build a resource model for interacting with a hosting infrastructure that manages and executes custom programs, including continuation-based programs, and supports multi-tenancy, high scalability, high density, and a uniform application-programming model. For example, although it may be sensible for the cloud-based provider to group all of a particular tenants data tables together and present these as one type of resource for management, the tenant may have a completely different logical view related to how the tenant thinks about and interacts with the data. For example, one data table related to a human resources department may have completely different characteristics and requirements from another data table related to accounting. Today's cloud-based infrastructure provides a model that is better suited to the cloud provider than to the way cloud tenants work with and think about data, applications, and other cloud-based entities.

SUMMARY

A hosted resource management system is described herein that provides systems and methods whereby a cloud-based tenant can define a logical model that allows the tenant to work with cloud-based entities in a manner that aligns with the tenant's own purpose and thinking. The system then reflects this model in a set of management tools and access paradigms that are provided to the cloud-based tenant. Each division in the logical model is termed a scope, and can include various types of cloud-based entities. The logical model may be hierarchical or include other methods of organization so that particular scopes can be nested, take on parent-child relationships, and have other relationships with other scopes. Each of these scopes may contain similar cloud-based entity types, such as business process definitions, scripts, configurations, graphics, workflows, or data tables. Because of the structure and organization provided by scopes, the tenant can manage these cloud-based entities according to the view and model that the tenant defines. Thus, the hosted resource management system provides a way of managing cloud-based entities that is intuitive for cloud-based tenants and facilities easier management of large-scale applications with many cloud-based entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
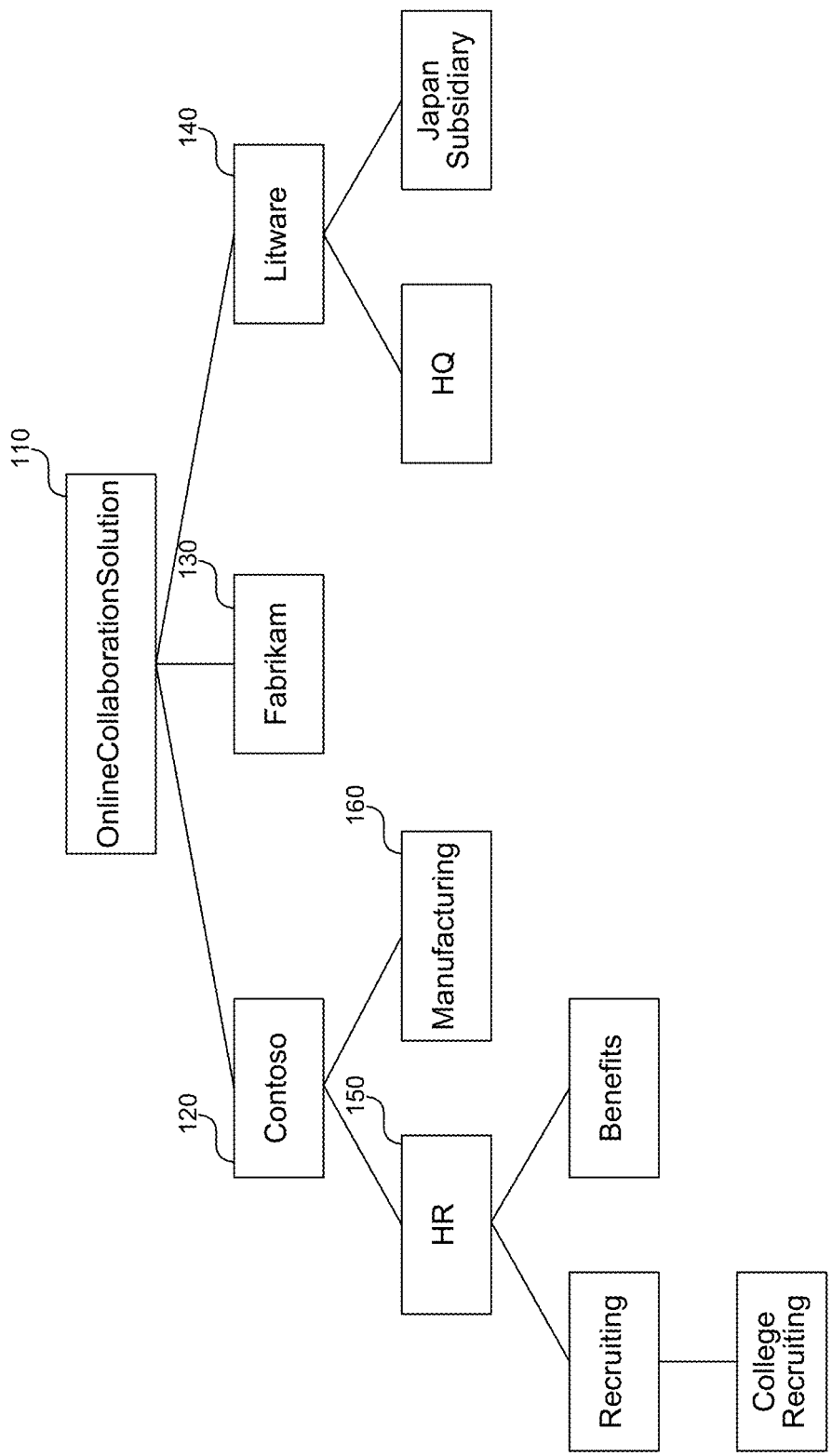
FIG. 1 is a block diagram that illustrates a hierarchical set of scopes for representing cloud-based entities in a logical model, in one embodiment.

A hosted resource management system is described herein that provides systems and methods whereby a cloud-based tenant can define a logical model that allows the tenant to work with cloud-based entities in a manner that aligns with the tenant's own purpose and thinking. The system then reflects this model in a set of management tools and access paradigms that are provided to the cloud-based tenant. For example, in some embodiments, the logical model defined by a tenant is exposed by the cloud-based provider as a set of uniform resource locators (URLs) through which the tenant accesses the tenant's cloud-based entities. Each division in the logical model is termed a scope, and can include various types of cloud-based entities. The logical model may be hierarchical or include other methods of organization so that particular scopes can be nested, take on parent-child relationships, and have other relationships with other scopes. In this way, it is possible that in the previous example that a tenant could organize all of the tenant's cloud-based entities related to a human resources department under one scope, and all of the tenant's cloud-based entities related to an accounting department under another scope. Each of these scopes may contain similar cloud-based entity types, such as business process definitions, scripts, configurations, graphics, workflows, or data tables. Because of the structure and organization provided by scopes, the tenant can manage these cloud-based entities according to the view and model that the tenant defines. Thus, the hosted resource management system provides a way of managing cloud-based entities that is intuitive for cloud-based tenants and facilities easier management of large-scale applications with many cloud-based entities.

In some embodiments, scopes are organized hierarchically starting with a high-level namespace (which is itself a scope at the top level), followed by one or more nested scopes, followed by cloud-based entities at the leaf nodes. These can be presented in URL form as "http://{namespace}.workflow.windows.net/{scope}/ . . . /{scope}/{named-entity}", where each item in curly braces is replaced with a name defined by the tenant that defines the resource model for a particular cloud-based application. The named entities may be workflows, data sets, configuration, graphics, business process definitions, documents, activities, or any other cloud-based entities hosted by a particular cloud-based provider. In addition, the base URI (workflow.windows.net) may be generalized to any hosted resource provider. Scopes provide a uniform way of representing groups of resources handled by hosting infrastructure. For example, by placing two workflows in the same scope, a tenant can express a logical relationship between those two workflows, and can manage them in a similar way. A multi-tenant host can use scopes to represent tenants, tenant applications, and other structures and collections of resources by separately maintaining higher-level scopes that are not presented to tenants. For example, the host may maintain a scope for each tenant, and then hand each tenant access to a scope that is actually at the second level of the hierarchy. The tenant can then interact with the tenant's own data but cannot access other branches of the hierarchy that include other tenants' data.

In some embodiments, the hosted resource management system uses the resource model and scopes for managing a multi-tenant execution environment. The same semantics for managing resource can also be applied to executing, pausing, and resuming workflows or other application and service types. The system may even allow suspending and resuming to be applied to a scope itself, such that all workflows within the scope are affected at once with a single management command. The semantic of scopes at various levels of hierarchy is not predetermined by the system, but rather is provided by the tenant or owner of the given scope or parent scope. The semantics of a scope can be associated with particular policies, including a set of security settings. For example, a particular organization may provide management access to its top-level cloud-based entities to an information technology (IT) department, which then delegates access to particular child scopes defined for individual departments or other delineations within the organization.

The parent-child relationship in a hierarchy can be used to influence the mechanism for resolving references to resources, propagating configuration and security settings, and so forth. For example, some scopes may allow defining security settings only at a high level scope and then may inherit those settings for all child scopes. Other scopes may supply a default set of configuration parameters at a parent scope, and then allow child scopes to either inherit those settings or override them.

Typical resource models for cloud services are flat or have a predetermined hierarchy. For instance, a table in WINDOWS™ AZURE™ Storage is represented as a top-level member of storage namespace, such as defined by the URL "http://myaccount.table.core.windows.net/mytable". In such resource models, there is no built-in ability to arbitrarily group resources, especially resources of various kinds. The hosted resource management system provides a uniform way of representing groups of resources as scopes.

FIG. 1 is a block diagram that illustrates a hierarchical set of scopes for representing cloud-based entities in a logical model, in one embodiment. One way of representing the root scope in a subscription named OnlineCollaborationSolution is shown in the URL http://onlinecollaborationsolution-.workflows.windows.net, where the root scope becomes the left-most name in the URL. Other approaches are possible, such as all scopes (including the root) being identified in the path. Furthermore, it is also possible (with appropriate domain name system (DNS) entries) to embed multiple scopes in the domain name (e.g., scope2.scope1.baseuri.net, where scope2 would typically be a child of scope1). The owner of this subscription can create an arbitrary number of scopes below this root scope in an arbitrary hierarchy. For instance, the owner could create top-level scopes to represent tenants of OnlineCollaborationSolution application, such as Contoso, Fabriikam, and Litware. OnlineCollaborationSolution can allow their tenants to create entities that would be represented as nested scopes in the Resource Model, as illustrated in FIG. 1. The OnlineCollaborationSolution node 110 includes three children represented as the Contoso node 120, the Fabrikam node 130, and the Litware node 140. The Contoso node 120 has further child scopes represented by the HR node 150 and the Manufacturing node 160. In this example, the Manufacturing scope represented by the Manufacturing node 160 can be represented in URL form as http://onlinecollaborationsolution.workflows.windows.net/Contoso/Manufacturing, in which the top-level scope is part of the domain name, and the child scopes are presented hierarchically as virtual directories.

In some embodiments, these URLs can also be used for management tasks. For example, to create a new scope named "Bikes" within the Manufacturing scope, the authorized caller can simply issue a Hypertext Transfer Protocol (HTTP) PUT request to http://onlinecollaborationsolution-.workflows.windows.net/Contoso/Manufacturing/Bikes, passing a payload that represents the definition of the new scope, represented for instance as a JavaScript Object Notation (JSON) string or XML.

Figure 2:
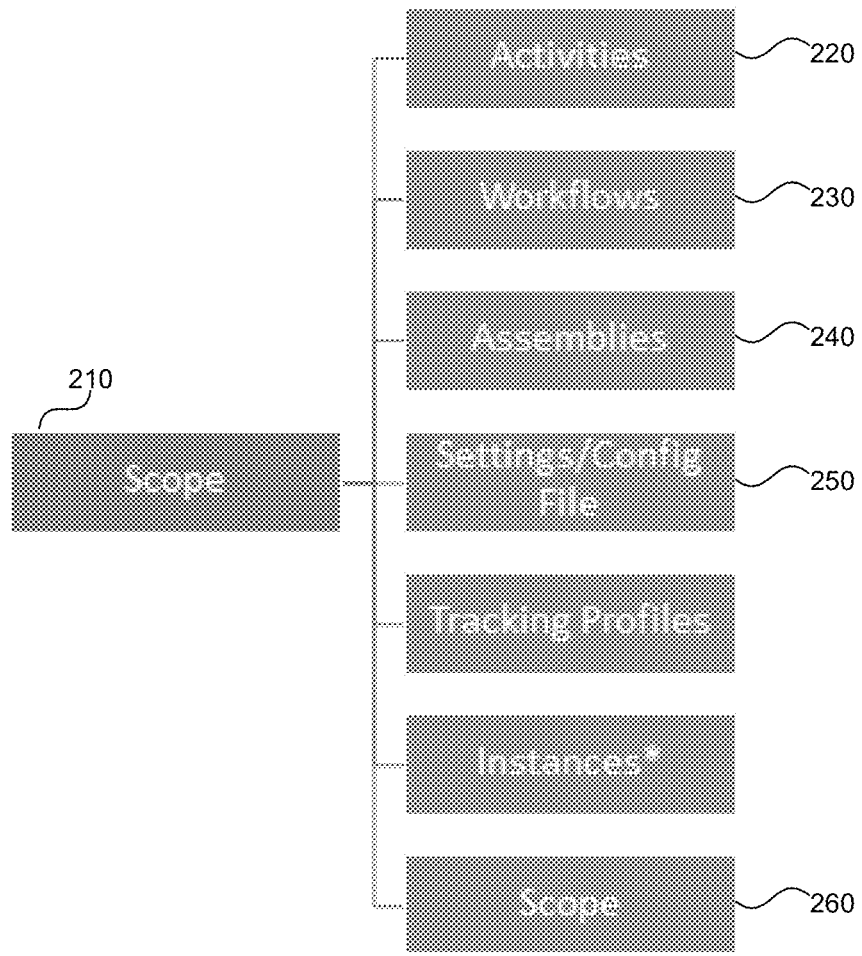
FIG. 2 is a block diagram that illustrates cloud-based entities that can be managed within a scope, in one embodiment.

FIG. 2 is a block diagram that illustrates cloud-based entities that can be managed within a scope, in one embodiment. Each scope 210 can contain various types of resources supported by the hosting infrastructure, including activities 220, workflows 230, assemblies 240, configuration 250, and so forth, as well as nested scopes 260. Resources of a given type can be grouped into containers, such as a "Workflows" container for each workflow in given scope. To create a new workflow for processing benefit claims, the authorized caller can simply issue a HTTP PUT request to http://onlinecollaborationsolution.workflows.windows.net/Contoso/HR/Benefits/VVorkflow s/ClaimProcessing, passing a payload that represents the definition of the new workflow, represented for instance as a JSON string or other definition.

By representing the resource model in the way described above the system: 1) can expose a uniform way of representing groups of resources handled by the hosting infrastructure, 2) can model tenants, tenant applications, and other structures and collections of resources as scopes, 3) can manage a multi-tenant execution environment, 4) can enable its top level tenants (a.k.a. C1 or Category 1 tenants) to represents their own tenants (a.k.a. C2 or Category 2 tenants) in the system and can support arbitrary depth of tenant categories, 5) can have either a pre-determined semantic for various scopes at various levels or—what is often more helpful —allow the "owner" of the given scope (or the owner of a parent scope) to express the semantic through policies, including a set of security settings, 6) can provide reach manageability for each scope, including an ability to disable/suspend a scope, to enable/resume a scope, to create a backup of a scope, and to perform a point-in-time restore of a scope, 7) can use scopes as a mechanism for configuration, 8) can use scopes to map to isolation boundaries of a host, 9) can access resources based on correlated metadata, and 10) can access a subset of resources based on a range of values. These and other attributes of the system are described in further detail herein.

Figure 3:
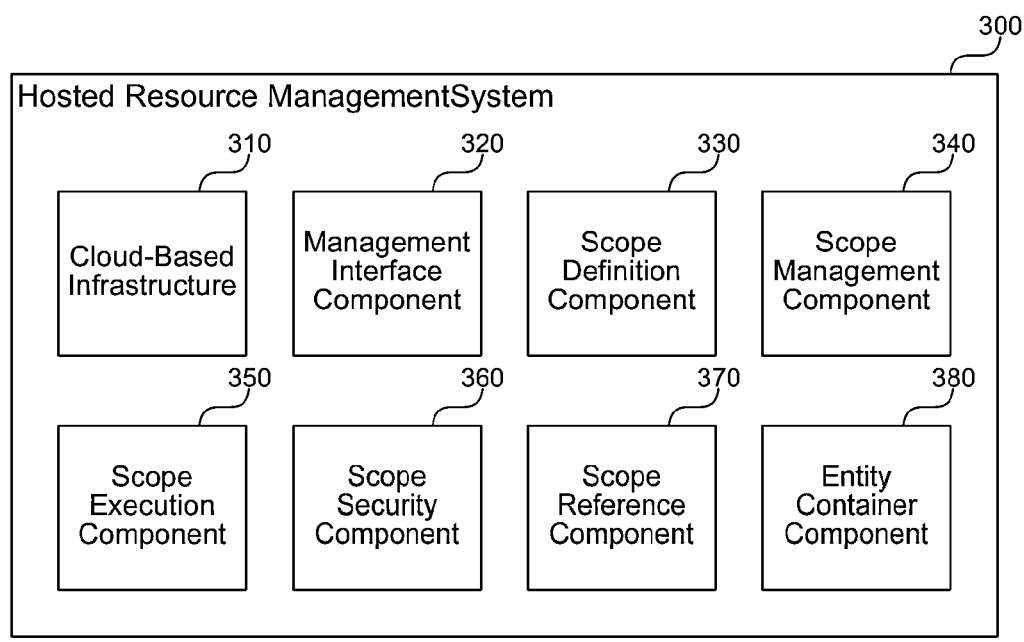
FIG. 3 is a block diagram that illustrates components of the hosted resource management system, in one embodiment.

FIG. 3 is a block diagram that illustrates components of the hosted resource management system, in one embodiment. The system 300 includes a cloud-based infrastructure 310, a management interface component 320, a scope definition component 330, a scope management component 340, a scope execution component 350, a scope security component 360, a scope reference component 370, and an entity container component 380. Each of these components is described in further detail herein.

The cloud-based infrastructure 310 includes a cloud-based environment that provides one or more storage, processing, and other resources for storing cloud-based data and executing cloud-based software programs. The cloud-based infrastructure 310 may include one or more servers, storage facilities (e.g., file systems, hard drives, storage area networks (SANs), databases, and so on), communications resources (e.g., wired networking, wireless network, local area networks (LANs), wide area networks (WANs), intranets, the Internet, and so on). Cloud-based programs and data are deployed by a tenant to the cloud-based infrastructure 310 and then managed by the tenant using the techniques described herein. Management may include allocating resources, dedicating resources to particular tasks, checking the status of resources and programs, configuring parameters of operation, configuring security policies, delegating access to particular functions, moving data and or applications, uploading assemblies or data, and so forth.

The management interface component 320 provides a programmatic interface through which software can access the cloud-based infrastructure 310 to perform maintenance operations. The programmatic interface may include a web service, network port and protocol, message-passing broker, or any other standard or proprietary communication method for accessing the cloud-based infrastructure 310 programmatically through software. The management interface component 320 may also provide one or more user-accessible web pages through which a tenant can manage the cloud-based infrastructure 310 using standardized web pages accessed through a client web browser. The cloud-based host may also provide other standard or proprietary programs for accessing the cloud-based infrastructure 310 through the management interface component 320.

The scope definition component 330 receives requests to define one or more new scopes, wherein a scope specifies a logical grouping of resource defined by a tenant using the cloud-based infrastructure 310. The logical grouping may include hierarchically nested scopes or other arrangements of scopes that allow the tenant to build a model for the tenant's cloud-hosted data and programs that allow the tenant to manage the programs and data in a manner most convenient for the tenant. The logical groupings chosen by the tenant may or may be related to divisions of cloud-based entities defined by the cloud-based host. For example, although the cloud-based host defines concepts like tables or other structured data, the tenant may or may not group tables together. Typically, the tenant will choose to group tables, workflows, and other cloud-based entities used for one business purpose together in one scope, while grouping similar cloud-based entities used for another business purpose in another scope. Additional scopes may relate the two scopes together by defining a hierarchical ancestor or meeting point between them.

The scope management component 340 provides an interface for managing previously defined scopes. The scope management component 340 may provide one or more programmatic (e.g., a web service or other network-based API), graphical (e.g., a desktop application or other graphical user interface (GUI)), console (e.g., MICROSOFT™ WINDOWS™ POWERSHELL™ cmdlets or other console user interface (CUI)), or other application-programming interfaces (APIs) for managing scopes. Management of a scope may include deleting the scope, modifying properties of the scope, changing security permissions associated with the scope, adding containers to the scope (described further below), adding cloud-based entities to the scope, rearranging the scope's position in a hierarchy of scopes, and so forth. The scope management component 340 may invoke the scope security component 360 to ensure that a user representative of the tenant that attempts to perform particular management operations has the authority to perform the operations. In some embodiments, the system 300 provides a representational state transfer (REST)-based API based on HTTP or another protocol that allows the tenant to issue scope management requests by providing data via a web-based URL (e.g., using an HTTP POST verb) or similar mechanism.

The scope execution component 350 receives requests to execute one or more executable cloud-based entities or resources associated with a scope and invokes workflows or other executable cloud-based entities associated with the scope. Execution may include starting execution, stopping execution, check pointing an executing activity, pausing a workflow, resuming a workflow, or other operations that affect the continued processing of an executable entity. By providing a model that allows grouping of cloud-based entities, the system 300 enables group-based operations related to execution of the entities within a particular group. This is a powerful concept, as it frees the tenant or administrator from individually managing potentially many cloud-based entities, and allows the tenant to group the entities in logical groups that are often managed in the same way. For example, a particular group of entities may have previously been commonly stopped or started at the same time, and by grouping them in a scope the tenant can perform automatically in one group operation what used to take many manual, individual entity operations.

The scope security component 360 receives and enforces security information associated with defined scopes. The security information defines which users are authorized to perform particular scope management operations and other operations related to cloud-based entities. For example, for a particular tenant that represents a business organization, an IT administrator may have high-level authority to perform all or most operations on a root level scope and related entities. The IT administrator may then delegate to department heads the authority to perform operations related to a child scope of the root scope that represents entities associated with each department head's department within the organization. This allows the administrator to confidently delegate responsibility for subsets of the cloud-based entities, while still maintaining high-level control and preventing one department from inadvertently affecting the proper operation of another department's entities.

The scope reference component 370 provides a canonical representation for referring to each defined scope managed by the system 300. For example, the system may define a URL for each scope that includes a namespace and scopes mapped to virtual directory components of the URL. Other representations may also be chosen, such as using the query string portion of a URL, or using methods other than URLs, such as an extensible markup language (XML) hierarchy, text-based or binary-based reference, numeric identifiers, and so forth. The scope reference component 370 provides a representation for any particular implementation of the system 300 that is well suited to the purpose of that implementation and has the characteristic of allowing users of the system 300 to recognize and refer to particular scopes so that the users can perform management operations, execution operations, security operations, or other actions with respect to scopes.

The entity container component 380 optionally creates containers within each scope that groups cloud-based entities by type. For example, the entity container component may create containers for workflow activities, workflows, assemblies, configuration data, security policies, child scopes, and other entities that would otherwise be unorganized at the scope level (i.e., within a single scope). The containers provide organization within a particular scope and allow particular operations to be focused on a particular entity type. For example, a tenant could perform an operation that only affected all of the workflows associated with a particular scope, but did not affect other non-workflow entities at the same scope.

The computing device on which the hosted resource management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
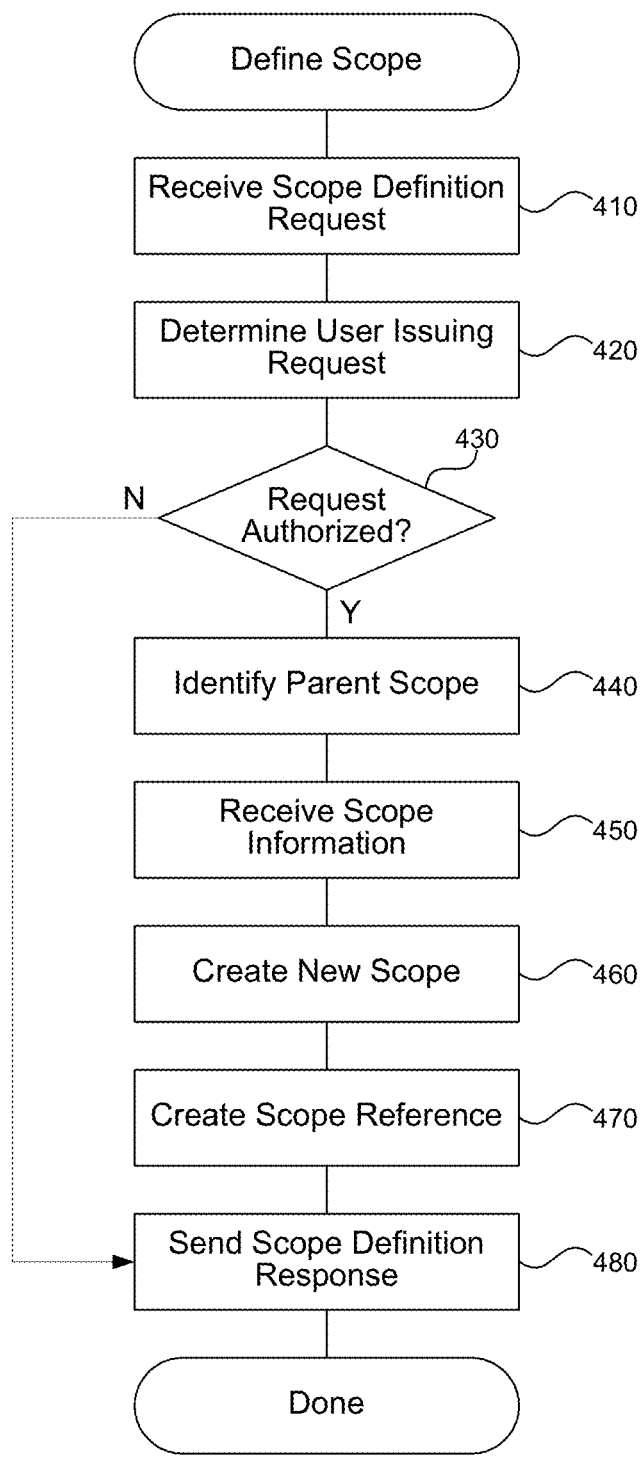
FIG. 4 is a flow diagram that illustrates processing of the hosted resource management system to receive a request to define a scope, in one embodiment.

FIG. 4 is a flow diagram that illustrates processing of the hosted resource management system to receive a request to define a scope, in one embodiment.

Beginning in block 410, the system receives a request to define a new scope, wherein the scope associates one or more cloud-based entities in a logical representation defined by a cloud tenant associated with the cloud-based entities. The tenant may submit the request using a software application that communicates with a cloud-based host using one or more network-based APIs, may submit the request via a web form or other web-based interface, or may access some other interface provided by the system for creating scopes. The request may identify a particular existing scope that is to be the parent of the newly defined scope, as well as properties to be associated with the newly defined scope, such as a name, security parameters, or other information.

Continuing in block 420, the system determines an identity of a user that issued the received request. The user may have previously logged into the system by providing security credentials or other information, such as identifying a user profile stored by the system that identifies the user. The identity of the user determines actions that the user is authorized to perform. Actions that the user can perform may be associated with particular scopes such as through access control lists (ACLS), access control entries (ACEs), or other security data structures. Security properties of scopes may also inherit from parent scopes to child scopes, and inherited security properties may be overridden by particular child scopes.

Continuing in decision block 430, if the system determines that the identified user is authorized to perform the received request, then the system continues at block 440, else the system denies the request and completes. The request may be denied either because the user is not authorized to perform the request, or because the request is invalid for some other reason (e.g., a particular scope that does not allow the creation of child scopes).

Continuing in block 440, the system identifies a parent scope to be associated with the newly defined scope. The request may include information identifying a parent scope, such as a URL or other identifier associated with the parent scope. The system may also receive a request to create a root level scope, in which case the parent scope may be null or some other value that indicates a request to define a root level scope. In some embodiments, the system may infer the parent scope, such as based on previous operations that may have set a cursor-like data structure that identifies the parent scope based on previous operations that set the focus to a particular scope.

Continuing in block 450, the system receives one or more scope properties to be associated with the newly defined scope. The scope properties may include a name, particular cloud-based entities to associate with the new scope, security properties of the new scope, and other information that characterizes the newly defined scope. In some embodiments, the tenant may specify a base level of information about the scope in the scope definition request, and may issue subsequent requests to set additional properties of the scope. The tenant may specify properties of the scope through a JSON string, an HTML form, an XML file, or other data communication method.

Continuing in block 460, the system creates the newly defined scope based on the received scope properties and associates the newly defined scope with the identified parent scope. The system may create one or more data structures that define scopes in memory and in more permanent storage, such as rows in a scope table of a database. The system sets scope properties within the data structure. The properties may include information identifying the user that created the scope, when the scope was created, a name for the scope, a position of the scope within a hierarchy, and other information.

Continuing in block 470, the system creates a canonical reference for later referring to the scope. For example, the system may create a URL or other identifier with which the scope can be accessed, and provide the URL or other identifier as output in response to the scope definition request. The system may store information about how the scope is referenced along with the other properties of the newly defined scope in a database or other data storage facility. The system may also create containers associated with the newly defined scope for grouping cloud-based entities at the scope level based on type or other common attributes.

Continuing in block 480, the system sends a scope definition response that indicates success or failure of the scope definition request. If the request succeeded, then the tenant can issue follow up requests that manage the scope, associated entities with the scope, change scope properties, and so forth. The scope definition request and response may comprise a standard HTTP request and response, such as an HTTP PUT request and corresponding numeric and text response (e.g., 200 OK, 500 Internal Error, and so on). After block 480, these steps conclude.

Figure 5:
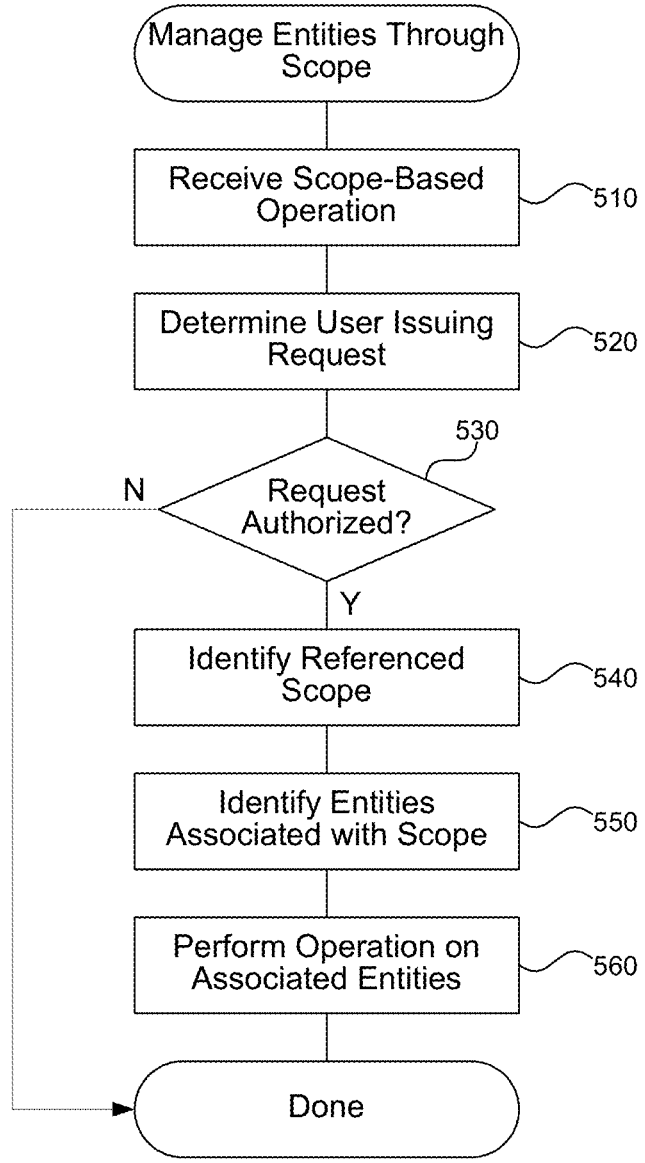
FIG. 5 is a flow diagram that illustrates processing of the hosted resource management system to receive a request to manage cloud-based entities through a resource scope that logically groups entities, in one embodiment.

FIG. 5 is a flow diagram that illustrates processing of the hosted resource management system to receive a request to manage cloud-based entities through a resource scope that logically groups entities, in one embodiment.

Beginning in block 510, the system receives a request to perform a scope-based operation on one or more cloud-based entities associated with an identified scope, wherein the scope includes some entities of a particular type provided by a cloud-based host and excludes at least one entity of the particular type that is not a member of the scope. The system may receive the request via a web service API, web page, or other interface for receiving scope based requests. In some cases, a cloud tenant may issue the request by specifying a previously agreed upon URL that defines the details of the request. For example, the request may include a URL that identifies a particular scope and payload data that identifies the requested operation.

Continuing in block 520, the system determines an identity of a user that issued the received request. The user may have previously logged into the system by providing security credentials or other information, such as identifying a user profile stored by the system that identifies the user. The identity of the user determines actions that the user is authorized to perform. Actions that the user can perform may be associated with particular scopes such as through access control lists (ACLS), access control entries (ACEs), or other security data structures. Security properties of scopes may also inherit from parent scopes to child scopes, and inherited security properties may be overridden by particular child scopes.

Continuing in decision block 530, if the system determines that the identified user is authorized to perform the received request, then the system continues at block 540, else the system denies the request and completes. The request may be denied either because the user is not authorized to perform the request, or because the request is invalid for some other reason (e.g., a particular scope that does not allow the requested operation).

Continuing in block 540, the system identifies the scope referenced by the received request. The system may identify the referenced scope by parsing a URL received with the request, by looking up an identifier received with the request, or by another method that requestors and the system agree upon in a particular implementation for referencing a particular scope. In some cases, the scope may be determined implicitly based on previous operations and a last scope used or an active scope that was set by a previous operation.

Continuing in block 550, the system identifies one or more cloud-based entities associated with the identified scope. The cloud-based entities may include activities, workflows, configuration data, assemblies, security information, instances, child-scopes, and other entities associated with the identified scope. In some cases, the request may identify a particular type of entity associated with the request, so that the requested operation will affect only entities of that type that are associated with the identified scope. The system may maintain scope information in a database table or other suitable data store, and may determine the association of scope to entities by looking up information previously stored in the data store.

Continuing in block 560, the system performs the scope-based operation identified in the request on the identified entities associated with the identified scope. The operation may include a wide variety of actions, such as starting, stopping, or otherwise affecting execution of a runnable entity, performing management operations on one or more entities, setting security information for entities, and so forth. After block 560, these steps conclude.

In some embodiments, the hosted resource management system receives information with a scope-based operation that indicates whether the operation will affect child scopes. For example, a particular operation may be specified to be recursive in nature, such that the operation is performed at an identified scope level and at all scopes below that level. Other operations may affect only the identified scope, and not apply recursively to child scopes of the identified scope.

In some embodiments, the hosted resource management system simplifies support of a concept in a multi-tenant hosting environment of sub-tenants. For example, a main tenant of a particular host may provide a website service that provides individualized websites to a variety of sub-tenants. It is important to the main tenant that one sub-tenant not be able to view or affect the cloud-based entities associated with other sub-tenants. Using the scopes described herein, the main tenant can create a scope for each sub-tenant, associate each sub-tenant's resources with the scope associated with that sub-tenant, and then provide access at the sub-tenant scope level to the sub-tenant. In this way, the sub-tenant can access and manage its own resources without affecting cloud-based entities of other sub-tenants.

In some embodiments, the hosted resource management system provides throttling and quotas in association with scopes. The system can define a particular quota that affects a branch of scopes. For example, the system might define that a particular child scope and all of its descendants (i.e., a branch) are limited to a particular quantity of disk-based storage. As another example, the system may limit a particular scope or branch to a threshold level of requests in a time period (i.e., a throttle).

In some embodiments, the hosted resource management system provides relative references within the scope hierarchy, so that a particular scope node can access sibling and other related nodes without extensive knowledge of the full hierarchy. In many cases, such as that of a sub-tenant described above, a user managing a particular scope may not know what scopes lie above that particular scope. However, the user may have a reason to want to move up by one scope and perform an operation, or to perform an operation on a sibling scope that shares the same parent. Relative references allow the user to refer to the target scope based on a current scope. For example, the user may form a URL that includes "$current" to represent the current scope location, and then uses " . . . " or other keywords to identify relative locations from there.

In some embodiments, the hosted resource management system merges settings at a scope and its parent scopes upon receiving a request to perform a particular operation. For example, if a scope receives a request to start a particular workflow, the scope may incorporate workflow settings from the present scope that override default settings provided at a parent scope (and potentially further up the hierarchy) to form a flat set of workflow settings provided to the workflow.

In some embodiments, the hosted resource management system tracks versioning information for scopes. Some scope operations may affect ongoing operations, such as currently executing workflows. Rather than abruptly revoking particular resources or scopes, the system may update version information so that currently running operations are presented with an older version of the resource model, while new operations are presented with a new version of the resource model. For example, if a tenant deletes a scope that is in use, the resource model version may be updated to indicate that the scope is present in an old version of the resource model but not a new version of the resource model. In this way, running operations can continue to reference the deleted scope, but the delete operation will remove the scope's availability to future operations.

From the foregoing, it will be appreciated that specific embodiments of the hosted resource management system have been described herein for purposes of illustration, but that various modifications may be made without deviating from the spirit and scope of the invention. Accordingly, the invention is not limited except as by the appended claims.

We claim:

1. A computer-implemented method to handle a request to define a scope for managing resources in a cloud-hosted environment, the method comprising:
   receiving a request to define a new scope, wherein the scope associates one or more cloud-based entities in a logical representation defined by a cloud tenant associated with the cloud-based entities;
   identifying a parent scope to be associated with the newly defined scope, wherein the parent scope can be empty to indicate a root-level scope;
   receiving one or more scope properties to be associated with the newly defined scope;
   creating the newly defined scope based on the received scope properties and associating
   the newly defined scope with the identified parent scope; and
   sending a scope definition response that indicates success or failure of the scope definition request,
   wherein the preceding steps are performed by at least one processor.

2. The method of claim 1 wherein receiving the request comprises the tenant submitting the request using a software application that communicates with a cloud-based host using one or more network-based application-programming interfaces (APIs) for creating scopes.

3. The method of claim 1 wherein receiving the request comprises receiving information with the request that identifies a particular existing scope that is to be the parent of the newly defined scope.

4. The method of claim 1 wherein receiving the request comprises receiving information with the request that identifies a name for the newly defined scope and security parameters for the newly defined scope.

5. The method of claim 1 further comprising, upon receiving the request determining an identity of a user that issued the received request, and if the identified user is not authorized to perform the received request, denying the request.

6. The method of claim 1 wherein identifying the parent scope comprises inferring the parent scope based on at least one previous operation that set a focus to a particular scope.

7. The method of claim 1 wherein receiving one or more scope properties comprises receiving an identification of at least one cloud-based entity to associate with the new scope.

8. The method of claim 1 wherein creating the newly defined scope comprises creating one or more data structures that define the scope and setting the received scope properties within the data structure.

9. The method of claim 1 further comprising creating a canonical reference for later referring to the scope.

10. The method of claim 1 further comprising creating one or more containers associated with the newly defined scope for grouping cloud-based entities at the scope level based on type or other common attributes.

11. A computer-readable storage device comprising instructions for controlling a computer system to manage cloud-based entities through a resource scope that logically groups entities, wherein the instructions, upon execution, cause a processor to perform actions comprising:
   receiving a request from a user to perform a scope-based operation on one or more cloud-based entities associated with an identified scope, wherein the scope represents a logical grouping of the one or more cloud-based entities arranged in a hierarchy and handled by a cloud-based host, the one or more cloud-based entities being of a particular type provided by a-the cloud-based host and excluding at least one entity of the particular type that is not a member of the scope; identifying the scope referenced by the received request; identifying the one or more cloud-based entities associated with the identified scope; and performing the scope-based operation identified in the request on the identified cloud-based entities associated with the identified scope.

12. The computer-readable storage device of claim 11 wherein identifying the scope referenced by the received request comprises identifying the referenced scope by parsing a uniform resource locator (URL) received with the request.

13. The computer-readable storage device of claim 11 wherein performing the scope-based operation comprises starting or stopping execution of one or more software workflows associated with the identified scope.

14. A computing system, comprising:
   a processor and a memory containing instructions that when executed by the processor, causing the processor to perform a process including: receiving a request from a user to create a scope, wherein the scope represents a logical grouping of at least one cloud-based entity associated with the user and handled by a cloud hosting infrastructure, the cloud-based entity including a process definition, a script, a configuration, a graphic, a workflow, or a data table;
   receiving a name for the requested scope and an identification of one or more cloud-based entities associated with the user and handled by the cloud hosting infrastructure that are to be associated with the requested scope; creating the requested scope having the received name and associating the identified one or more cloud-based entities with the created scope; and generating a reference to the created scope, the generated reference allows access to the generated scope and the one or more cloud-based entities associated with the scope.

15. The computing system of claim 14 wherein receiving the request comprises receiving a request at a network-based application-programming interface associated with the cloud hosting infrastructure.

16. The computing system of claim 14 wherein:
receiving the request comprises receiving an identification of an existing scope that is to be a parent of the requested scope; and
creating the requested scope includes associating the created scope as a child scope of the identified existing scope.

17. The computing system of claim 14 wherein: the created scope is a first scope; the process further includes:
receiving a request from the user to create a second scope that is to be a child scope of the first scope; and
creating the requested second scope and associating the created second scope as a child scope of the first scope.

18. The computing system of claim 14 wherein creating the requested scope comprises creating one or more database structures that define the created scope.

19. The computing system of claim 14 wherein creating the requested scope further includes creating one or more containers associated with the created scope for grouping the one or more cloud-based entities based on an entity type of the one or more cloud-based entities.

20. The computing system of claim 14 wherein the process performed by the processor further includes:
receiving a request to perform a scope-based operation on one or more of the cloud-based entities associated with the created scope;
identifying the created scope referenced by the received request;
identifying the one or more of the cloud-based entities associated with the identified scope; and
performing the scope-based operation identified in the request on the identified one or more of the cloud-based entities associated with the identified scope.

* * * * *